(12) United States Patent
Rancien et al.

(10) Patent No.: US 9,424,506 B2
(45) Date of Patent: Aug. 23, 2016

(54) E-DOCUMENT COMPRISING AN ELECTROMAGNETIC INTERFERENCE ELEMENT

(75) Inventors: Sandrine Rancien, La Murette (FR); Frederic Vicentini, Gemenos (FR); Thibaut Le Loarer, Pommier de Beaurepaire (FR); Alban Remy, Toulon (FR)

(73) Assignee: ARJOWIGGINS SECURITY, Paris (FR)

( * ) Notice: Subject to any disclaimer, the term of this patent is extended or adjusted under 35 U.S.C. 154(b) by 797 days.

(21) Appl. No.: 13/057,426

(22) PCT Filed: Aug. 11, 2009

(86) PCT No.: PCT/FR2009/051583
§ 371 (c)(1),
(2), (4) Date: Jul. 22, 2011

(87) PCT Pub. No.: WO2010/018346
PCT Pub. Date: Feb. 18, 2010

(65) Prior Publication Data
US 2011/0272464 A1    Nov. 10, 2011

(30) Foreign Application Priority Data
Aug. 12, 2008   (FR) .................................... 08 55538

(51) Int. Cl.
*G06K 19/02* (2006.01)
*G06K 19/073* (2006.01)

(52) U.S. Cl.
CPC ........ *G06K 19/07327* (2013.01); *G06K 19/025* (2013.01)

(58) Field of Classification Search
USPC ........................................................ 235/488
See application file for complete search history.

(56) References Cited

U.S. PATENT DOCUMENTS

| 5,682,143 | A | * | 10/1997 | Brady et al. | ............... 340/572.7 |
| 2007/0164866 | A1 | | 7/2007 | Robin et al. | |
| 2007/0289775 | A1 | * | 12/2007 | Potts et al. | .................... 174/350 |

(Continued)

FOREIGN PATENT DOCUMENTS

| EP | 0 470 760 A2 | 2/1992 |
| EP | 0 703 071 A1 | 3/1996 |

(Continued)

OTHER PUBLICATIONS

International Search Report issued in Application No. PCT/FR2009/051583; Dated Feb. 4, 2010 (With Translation).

*Primary Examiner* — Rafferty Kelly
(74) *Attorney, Agent, or Firm* — Oliff PLC (57) ABSTRACT

A laminated structure for an E-document, comprising a first support layer defining at least two flat flaps connected by at least one fold line, the first flap supporting an antenna and a microcircuit device enabling contactless data exchange, the second flap supporting an electromagnetic interference element arranged in relation to the microcircuit device so as to be able to oppose contactless reading and/or writing of the microcircuit device in at least one folded configuration of the structure, the structure having at least one heat-activated or pressure-sensitive adhesive layer making it possible to receive the microcircuit device and/or the antenna and/or the electromagnetic interference element at least in part in its thickness, and/or the flaps having at least one layer of an adhesive and/or a fibrous layer and/or a polymer layer having a different thickness for each of the flaps.

31 Claims, 5 Drawing Sheets

(56) References Cited

U.S. PATENT DOCUMENTS

2008/0186186 A1* 8/2008 Campbell ............... 340/572.8
2009/0026751 A1 1/2009 Rancien et al.

FOREIGN PATENT DOCUMENTS

| | | |
|---|---|---|
| FR | 2 863 748 A1 | 6/2005 |
| FR | 2 879 789 A1 | 6/2006 |
| FR | 2 888 367 | 1/2007 |
| FR | 2 888 368 A1 | 1/2007 |
| FR | 2 895 550 A1 | 6/2007 |
| JP | A-11-348471 | 12/1999 |
| WO | WO 2005/104024 A1 | 11/2005 |
| WO | WO 2005/119586 A1 | 12/2005 |
| WO | WO 2006/005984 A1 | 1/2006 |

* cited by examiner

E-DOCUMENT COMPRISING AN ELECTROMAGNETIC INTERFERENCE ELEMENT

The present invention concerns a laminated structure with flaps for an E-document with flaps as well as such an E-document.

The term E-document (or electronic document) refers to a document comprising information intended to be used in electronic form, without this information having to be printed on said document.

Figure 1A:
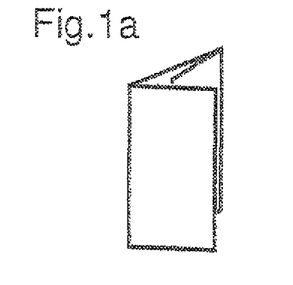
FIGS. 1a to 1c show different examples of document folding.
Figure 1B:
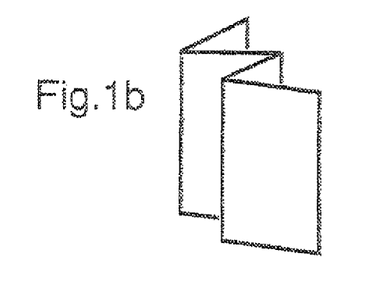
Figure 1C:
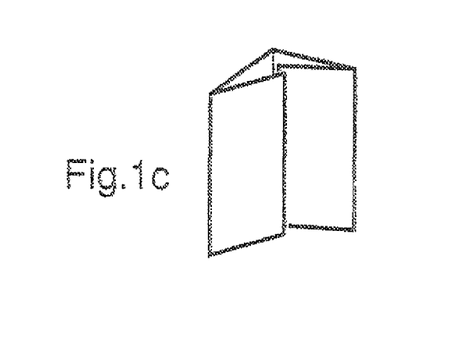

"Document with flaps" refers to a document which may or may not have a function for identification of a person or an object and which includes at least one folding zone, such as a passport booklet, a three-flap document able to be folded in a "triptych", as shown in FIG. 1a, such as a French vehicle registration document or driver's license, or a document which can be folded in an "accordion", as shown in FIG. 1b or in a multi-flap "wallet", as shown in FIG. 1c.

Means exist for protecting E-documents relative to the identification of a person and comprising an electronic device making it possible to exchange data without contact electromagnetically, in particular of the RFID (Radio Frequency Identification Device) type, against attempts to read and/or write data which may be done without the knowledge of the bearer of the E-document.

These means rely in particular on the insertion into the E-document of devices for mitigating or interfering with the electromagnetic field emitted by the readers which may be used to recover or modify the data contained in the integrated microcircuits of contactless electronic devices, without the knowledge of the bearer of the E-document. These devices are, for example, called electromagnetic screens or masking elements.

Known from patent application JP 11-348471 is a booklet comprising an electronic module supported by one of the flaps of the cover or one of the sheets of the booklet. The front flap of the cover of the booklet can define an electromagnetic screen and the electronic module is supported by the rear flap. Thus cover thus realized presents asymmetrical front and rear flaps. In one alternative, the electromagnetic screen is formed both on the front and rear flaps of the booklet and the electronic module is supported by a sheet of the booklet.

Known from patent applications FR 2 863 748 and FR 2 879 789 is a passport comprising, on a first flap of the cover, a transponder formed by an electronic module connected to an antenna. A second flap of the cover or one of the sheets of the booklet is provided with a passive element for masking the antenna of the transponder. The passport can have an extra thickness due to the presence of the masking element.

Known from international application WO 2006/005984 is a passport comprising, in one flap of its cover, an electronic device making it possible to exchange data without contact and, in the other flap of its cover or on one of the pages, an electromagnetic screen, in the form of a foil, a metal grid or a magnetic ink.

Also known from applications FR 2 888 367 and FR 2 888 368 is a passport comprising a contactless electronic device and a circuit forming a resonator, present for example in the form of coils making it possible to obtain the desired resonance frequency, the coils being realized on an intermediate layer of a cover. The intermediate layer is laminated with other layers to form the cover and receive an electronic device enabling a contactless exchange of data.

Also known from international application WO 2005/104024 is a booklet comprising two parts, one part comprising a transponder integrated therein and the other part supporting a shielding element occupying a zone whereof the area corresponds at least to that occupied by the transponder on the first part.

Also known from international application WO 2005/119586 is a passport comprising a transponder in a first flap of its cover, and a shielding element in a second flap.

The electronic documents proposed to date have a drawback in that the devices for attenuating or interfering with the electromagnetic field emitted by the readers to recover or modify the data contained in the integrated circuits of the electronic devices are inserted or attached to the security document but are not offset in thickness. The E-documents may then have a localized increase of their thickness, which may hinder the esthetics of the final document, make its folding difficult during storage, hinder its printing and/or its personalization, for example by inkjet or laser printing during the steps for printing data related to the holder of the E-document and lastly hinder the application of security films and/or laminated protective films on the printed notices of these documents.

For example, an extra thickness of 75 μm on one of the flaps of an electronic passport booklet integrating an electromagnetic screen into one of the flaps of the cover may hinder the personalization of the booklet in inkjet printing.

There is therefore a need to further improve the known. E-documents. The invention aims in particular to resolve certain drawbacks of the prior art. Exemplary embodiments of the invention provide a laminated structure for E-document with flaps comprising a first support layer defining at least two flat flaps folded by at least one folding line:

the first flap supporting, in particular comprising, a microcircuit device enabling contactless data exchange, in particular an integrated microcircuit device connected to an antenna, the second flap supporting, in particular comprising, an electromagnetic interference element arranged in relation to the microcircuit device so as to be able to oppose contactless reading and/or writing of the microcircuit device, in at least one folded configuration of the structure, a) the structure comprising at least one layer of a heat-activated or pressure-sensitive adhesive making it possible to receive the microcircuit device and/or the antenna connected to the microcircuit device and/or the electromagnetic interference element in its thickness at least in part, and/or b) the flaps having at least one adhesive layer and/or a fibrous layer and/or a polymer layer having a different thickness for each of the flaps.

"Laminated structure" refers to a multi-layer structure comprising fibrous or polymer layers assembled, for example, by cold or hot lamination using one or several intermediate adhesive layers or without an adhesive layer, by welding or fusion.

"Microcircuit device" refers to a device comprising at least one integrated memory circuit, with or without microprocessor, connected to at least one antenna and enabling contactless data exchange.

"Electromagnetic interference element" refers to an element having the property of attenuating, interfering with or blocking the electromagnetic wave emitted by an external reader during a communication with the E-document and more particularly having the property of attenuating, interfering with or blocking coupling of the contactless integrated microcircuit device with an external reader.

The structure is for example different from an E-document, being integrated into an E-document, being for example mounted between pages of the E-document and the cover of said E-document.

The flaps of the laminated structure according to the invention may be flat, the presence of the electromagnetic interference element and/or the integrated microcircuit and/or the antenna being offset in thickness in each of the flaps. Preferably the flaps of the laminated structure according to the invention are also coplanar, the first and the second flaps of the laminated structure having the same thickness.

The invention may make it possible to provide a unique finished laminated structure supporting both, in particular comprising both, the electromagnetic interference element and a microcircuit device enabling contactless data exchange, this structure being ready for use for making an E-document, for example an electronic driver's license or vehicle registration document, the finished structure also having the durability qualities desired for later use of the E-document.

The invention may also make it possible to provide a unique semi-finished structure supporting both an electromagnetic interference element and a microcircuit device contactless data exchange, this semi-finished laminated structure being able to be directly integrated into a document with flaps, for example a booklet or between two card bodies, without modifying the automatic assembly machines for producing E-documents at the final integrator.

This semi-finished structure may have both the advantage of mechanically protecting the contactless RFID device during the integration operation in the final E-document as well as that of not showing the localized additional thickness both at the RFID device and the electromagnetic interference element, which allows the integration of this structure in the rest of the document without modifying the outside appearance thereof.

According to one embodiment of the invention, the first flap comprises at least one so-called contactless operation microcircuit device, i.e. relying on the use of a radiofrequency electromagnetic wave emitted by an external reader toward an antenna connected to the integrated microcircuit.

The laminated structure may in particular comprise an integrated microcircuit device adapted to the contactless communication technology described in the ISO 14443 standard.

The microcircuit device enabling contactless data exchange includes a chip for example, such as a so-called "strap" chip, or a module chip connected to an antenna which may be a wire antenna, printed in particular by screen printing, etching, transfer, chemical deposition or electroplating. Alternatively, the antenna may be supported by the integrated microcircuit of the chip.

The laminated structure according to exemplary embodiments of the invention may also comprise microcircuit devices making it possible to exchange with and without contact, such as hybrid systems with two contact and contactless integrated microcircuits or such as the so-called "dual" systems with a single chip able to work with and without contact.

Electromagnetic Interference Element

The electromagnetic interference element may comprise means for attenuating, interfering with or blocking the electromagnetic coupling between the contactless integrated microcircuit device and an external reader, of the magnetic material, conductive material or resonator circuit type.

The electromagnetic interference element may be formed using at least one of the following elements:

- a support, which may be chosen from a film in plastic material, a paper, a textile or nonwoven fabric, coated or laminated with at least one metal film, for example an aluminum or copper film,
- a metalized support, in particular by vacuum metalizing or chemical processing, the support being for example chosen among a film in plastic material, a paper, a textile or a non-woven fabric,
- a support, in particular in paper or plastic material, charged with an electrically conductive charge such as carbon black or carbon fibers, metallic fibers, metalized fibers, metallic flakes, a metallic powder or with a conductive agent such as a salt, in particular sodium chloride or ammonium chloride,
- a support with intertwined wires, in particular a woven fabric, a knit, a grid, at least part of the wires being in an electrically conductive material, for example metal,
- a non-woven support comprising conductive fibers, for example metallic fibers, possibly mixed with synthetic fibers,
- a support, in particular a film, having an openwork metal structure,
- a metallic film,
- a metallic layer such as copper or pulverized zinc,
- an electrically conductive varnish or paint, for example copper-, nickel- or silver-based,
- an electrically conductive polymer such as polypyrrole, polyacetylene and polythiophene,
- an electrically conductive adhesive,
- a material comprising carbon nanotubes.
- printing done with conductive inks according to a determined pattern.

The electromagnetic interference element may also be formed using at least one of the following elements:

- a support, which may be chosen among a film made in a plastic material, a paper, a textile or a non-woven fabric, coated or laminated with at least one magnetic film,
- a support which may be chosen among a film made in a plastic material, a paper, a textile or a non-woven fabric, with a magnetic coating, deposited for example in vacuum or by chemical processing,
- a support, in particular made in paper or plastic material, charged with a magnetic charge such as ferrites,
- a support, in particular a film, having an openwork structure made in magnetic material,
- a magnetic film,
- a metallic layer in pulverized magnetic material.
- a magnetic varnish or paint,
- an adhesive comprising magnetic particles.
- a material comprising magnetic nanoparticles.

The electromagnetic interference element may extend partially or totally over the surface of the first flap. It may also extend partially or totally over the surface of one or several other flaps and potentially over the entire surface of the structure.

In one particular case, the interference element may have varied shapes and/or dimensions. For example, the electromagnetic interference element may have a rectangular, square, curved contour, for example circular or elliptical. The electromagnetic interference element may form a full pattern. Alternatively, the interference element assumes the form of a strip looped on itself, this strip for example being substantially rectangular or circular. The electromagnetic interference element may for example have a grid pattern, if so desired. In one particular case, the electromagnetic interference element may assume the form of an antenna-type resonator circuit.

Thus, in at least one folded configuration of the structure, for example when the angle between the first flap and the second flap is less than or equal to 10°, the electromagnetic interference element prevents read and/or write access to the information stored in the integrated microcircuit device, whether the reader is in front of the first or second flap.

Support Layers:

The first support layer may be a fibrous layer, for example made in paper or a non-woven fabric. "Fibrous layer" refers to a cellulosic fiber-based layer, for example cotton fibers, and/or synthetic fibers, for example polyamide and/or polyester fibers, and/or natural organic fibers other than cellulosics and/or mineral fibers. In particular this fibrous layer may be a saturated fibrous layer of a polymer latex and/or be embedded.

Alternatively, the first support layer may be a polymer layer.

Polymer layer refers to a layer comprising polyethylene (PE), polypropylene (PP), vinyl polychloride (PVC), polyethylene terephthalate (PET), polycarbonate (PC), polyester carbonate (PEC), polyethylene terephthalate glycol (PETG), an acrylonitrile butadyene styrene copolymer (ABS). In particular, this polymer layer may be charged with mineral charges such as the silica-charged polyethylene film marketed under the name TESLIN® or ARTYSIN® by the company PPG INDUSTRIES.

"Polymer layer" also refers to a coextruded layer, realized from at least one polymer material, and comprising a core layer and at least one skin layer, the core layer comprising voids. The "core layer" corresponds to a base layer farther from the surface of the layer than the "skin layer", which corresponds to a surface layer. The layer can in particular be realized according to the teaching of applications EP 0 470 760 and EP 0 703 071. For example, for the polymer layer one can use a polyethylene-based film marketed under the name POLYART® by the company ARJOWIGGINS.

The structure may comprise a second support layer and a third support layer, for example in the form of a fibrous layer or a polymer layer of a nature identical to those cited above, supported by the first and second flaps, respectively, the second and third layers having different thicknesses. The second support layer may only extend in part over the first flap and the third support layer may only extend in part of the second flap, so as to arrange a thickness reserve at the fold line of the structure. For example, at the fold line, the first support layer is not covered by the second and third support layers.

Alternatively, the second and third support layers extend continuously on either side of the fold line.

Compensation for the Thickness of the Integrated Microcircuit Device and/or the Electromagnetic Disturbance Element: Flat Flaps The first support layer may comprise at least one cavity in which the integrated microcircuit device is at least partially, or completely, housed. This cavity may or may not go all the way through.

The second support layer may comprise a cavity in which the microcircuit device is housed at least partially, or completely. This cavity may or may not go all the way through.

The first and second support layers may, for example, comprise cavities at least partially opposite each other, so as to form a housing in which one finds the microcircuit device.

The third support layer may comprise a cavity in which the electromagnetic interference element is housed. This cavity may or may not go all the way through.

When the first and second support layers are assembled using adhesive layers, the latter parts may comprise a cavity in which the microcircuit device is partially or totally housed.

The first support layer may comprise a cavity in which the electromagnetic interference element is housed. This cavity may or may not go all the way through.

Alternatively, the first and third support layers comprise cavities at least partially opposite each other, so as to form a housing in which the electromagnetic interference element is found. Alternatively, or in combination with the preceding, the laminated structure comprises a second support layer and a third support layer, supported by the first and second flaps, respectively, and at least one layer of a heat-activated or pressure-sensitive adhesive between the first and second support layers and/or between the first and third support layers.

Said adhesive layer is for example capable of flowing under pressure and/or temperature, which makes it possible to obtain compensation for the thickness of the microcircuit device and/or the antenna and/or the electromagnetic interference element located between the first support layer and the second or third support layer since, upon assembly of the structure, under the pressure and/or temperature action, the microcircuit device and/or the antenna and/or the electromagnetic interference element sinks into the adhesive layer, which makes it possible to offset the thickness of the microcircuit device and/or the antenna and/or the electromagnetic interference element.

The heat-activated adhesive layer comprises for example a polymer comprising polyurethane, polyethylene, an acrylic or vinylic polymer, for example polyvinylacetate and their mixtures.

The pressure-sensitive adhesive layer comprises for example an acrylic polymer and a resin, for example colophane- or hydrocarbon-based.

Also alternatively, the structure comprises both a second support layer and a third support layer as described above and at least one layer of an adhesive as described above.

Thickness Compensation Between the Flaps: Coplanar Flaps.

Thickness compensation between the first and second flaps of the structure, such that the first and second flaps are for example coplanar, may be realized:
  solely via fibrous layers and/or polymer layers with different thicknesses in the first and second flaps of the structure,
  solely via heat-activated or pressure-sensitive adhesive layers and/or adhesive layers with different thicknesses in the first and second flaps of the structure,
  solely via one or several adhesive layers present in the first and/or second flaps of the structure, or
  via fibrous layers and/or polymer layers and/or adhesive layers of different thicknesses and heat-activated or pressure-sensitive adhesive layers.

The structure may, for example, comprise two layers of adhesive supported by the first flap and the second flap, respectively, which may make it possible to offset the additional thickness created in the second flap in relation to the first flap due, for example, to the presence of the electromagnetic interference element.

The second flap may comprise two adhesive layers between which the electromagnetic interference element is arranged.

Surface Layer:

According to another embodiment, the structure comprises a surface layer extending over the first and second flaps. The structure may comprise at least one heat-activated or pressure-sensitive adhesive layer, located between the surface layer and the first support layer, making it possible to receive the integrated microcircuit device and/or the antenna and/or the electromagnetic interference element at least partially in its thickness.

Said adhesive layer is, for example, supported by the surface layer.

The first support layer and/or the surface layer can be in polymer layer, for example in polyester, which may make it possible to obtain a transparent structure and may grant a ludic effect to the structure thus obtained.

According to another embodiment, the structure comprises three flaps defined by the first support layer which extends over these three flaps.

The structure may comprise a surface layer extending over the first, second and third flaps.

The structure may comprise at least one layer of a heat-activated or pressure-sensitive adhesive layer, located between the surface layer and the first support layer, making it possible to receive the integrated microcircuit device and/or the antenna and/or the electromagnetic interference element at least partially in its thickness.

The heat-activated or pressure-sensitive adhesive layer may extend over the first, second and third flaps.

The heat-activated or pressure-sensitive adhesive layer is for example supported, before assembly in the structure, by the surface layer and for example extends continuously over the surface layer.

The electromagnetic interference element may comprise two parts supported by the second and third flaps, respectively.

The two parts of the interference element may extend continuously beyond the fold line or be separate.

The second and third flaps may be adjacent or alternatively may be connected by the first flap.

The structure, when it has two flaps, is for instance designed to be secured by sticking between the cover and the flyleaf of an E-document in the form of a booklet.

Other exemplary embodiments of the invention provide an E-document comprising a structure as described above.

Other exemplary embodiments of the invention provide a structure for E-document comprising a first paper support layer defining two flaps connected by at least one fold line:
  a first flap supporting, in particular comprising, a microcircuit device in the form of a module chip connected to a wire antenna,
  a second flap supporting, in particular comprising, an electromagnetic interference element in the form of a deposit of metallic particles, for example zinc, done by pulverization for example.

The first flap may comprise the first paper support layer, a first heat-activated adhesive layer coated on this first support layer and a second paper support layer coated with a second heat-activated adhesive layer, the first support layer and the second support layer each being provided with a window, which may or may not go through said first or second support layer, opposite each other, so as to each receive part of the module chip and offset its thickness, upon assembly of the first and second layers.

The wire antenna of the microcircuit device is for example deposited by ultrasound on the first adhesive layer coated on the first paper support layer.

The first and second paper support layers are for example laminated hot via first and second adhesive layers such that the antenna of the microcircuit device is located between the first and second heat-activated adhesive layers and between the first and second paper support layers.

The second flap may comprise the first paper support layer coated with the first heat-activated adhesive layer and a third paper support layer on which the electromagnetic interference element has been previously deposited. These two paper support layers are for example laminated via the first heat-activated adhesive layer such that the electromagnetic interference element is located between the first and third paper support layers.

The second and third paper support layers may extend partially over the first support of the first and second flaps without covering the fold line so as to create a thickness reserve at the fold line.

According to these exemplary embodiments of the invention, the thickness compensation between the two flaps, related to the presence of the electromagnetic interference element in the second flap, is realized using second and third support layers with different thicknesses and first and second adhesive layers with different thicknesses.

Similar embodiments may be realized without a second adhesive layer coated on the second support layer.

Other exemplary embodiments of the invention provide a structure for E-document comprising a first paper support layer defining two flaps connected by at least one fold line:
  a first flap supporting, in particular comprising, an integrated microcircuit device in the form of a module chip connected to a wire antenna deposited by ultrasounds in the first paper support layer,
  a second flap supporting, in particular comprising, an electromagnetic interference element in the form of a deposition of metallic particles, for example zinc, done by pulverization for example.

The first flap may comprise the first paper support layer and a second paper support layer which are each provided with a window, which may or may not go through them, opposite each other, so as to receive the module chip and offset its thickness, upon assembly of the first and second layers.

These two layers are, for example, laminated via a first heat-activated adhesive layer previously applied on the second paper support layer, such that the antenna of the microcircuit device is located between the first and second paper support layers.

The second flap comprises, for example, the first paper support layer and a third paper support layer on which the electromagnetic interference element has been previously deposited. These two paper support layers may be laminated via a second heat-activated adhesive layer, the second adhesive layer preferably being of an equivalent nature to the first adhesive layer.

The second adhesive layer is, for example, previously applied on the third paper support layer, such that the electromagnetic interference element is located between the first and third paper support layers. The second and third paper support layers may extend partially over the first support layer of the first and second flaps without covering the fold line so as to create a thickness reserve at the fold line.

According to these exemplary embodiments of the invention, the thickness compensation between the two flaps, related to the presence of the electromagnetic interference element in the second flap, is for example done by using second and third support layers of different thicknesses.

Other exemplary embodiments of the invention provide a structure for E-document comprising a first paper support layer defining two flaps connected by at least one fold line:
  a first flap supporting, in particular comprising, an integrated microcircuit device in the form of a module chip connected to a wire antenna deposited by ultrasounds in the first paper support layer, a second flap supporting, in particular comprising, an electromagnetic interference element in the form of a metallic film, for example aluminum.

The first flap may comprise the first paper support layer and a second paper support layer, these first and second layers each being provided with a window, which may or may not go all the way through it, positioned opposite each other so as to receive the module chip and offset its thickness, upon assembly of the first and second layers.

These two layers are for example laminated via a first heat-activated adhesive layer previously applied on the second paper support layer, such that the antenna of the contactless integrated microcircuit device is located between the first and second paper support layers.

The second flap for example comprises the first paper support layer and a third paper support layer on which the electromagnetic interference element was previously laminated via a third layer of permanent adhesive. The first and third paper support layers can be laminated via a second layer of a heat-activated adhesive, this second layer of adhesive being in particular of the same nature as the first layer of adhesive, such that the electromagnetic interference element is located between the first and third layers.

The second and third support layers may extend partially over the first support of the first and second flaps without covering the fold line so as to create a thickness reserve at the fold line.

According to these exemplary embodiments of the invention, the thickness compensation between the two flaps, related to the presence of the electromagnetic interference element in the second flap, may be done by using second and third paper support layers with different thicknesses and/or first, second and third adhesive layers of different thicknesses.

Other exemplary embodiments of the invention provide a structure for E-document, comprising a first paper support layer defining two flaps connected by at least one fold line:
a first flap supporting, in particular comprising, a microcircuit device in the form of a chip connected to a screened printed antenna, for example in silver, supported by the first paper support layer, and
a second flap supporting, in particular comprising, an electromagnetic interference element in the form of a deposition of metallic powder, for example zinc powder.

The first flap for example comprises the first paper support layer and a second paper support layer, the second layer being provided with a through window opposite the chip secured on the first support layer.

These first and second support layers are, for example, laminated via a first layer of pressure-sensitive adhesive, such that the antenna of the contactless integrated microcircuit device is located between the first and second paper support layers and the chip is in the window of the second paper support layer.

The second flap for example comprises the first paper support layer and a third paper support layer on which the electromagnetic interference element has been previously deposited by pulverization.

These two paper support layers are for example laminated via a second layer of pressure-sensitive adhesive, preferably of a nature equivalent to the first adhesive layer, such that the electromagnetic interference element is located between the first and third paper support layers.

The second and third paper support layers may be joined and form a single and unique surface layer which extends completely over the first support layer of the first and second flaps.

According to these embodiments of the invention, the thickness compensation between the two flaps, related to the presence of the electromagnetic interference element in the second flap, is for example realized by using first and second pressure-sensitive adhesive layers with different thicknesses.

The arrangement of the structure may on one hand make it possible for there to be no modification of the appearance of the structure and therefore of the E-document comprising such a semi-finished structure with onboard microcircuit device and electromagnetic interference element in relation to a structure without electromagnetic interference element, the interference element being sandwiched between the first and third paper support layers.

On the other hand, the structure may not have any material modification on its surface since the first, second and third support layers are made in paper, which may allow this structure with onboard electromagnetic support element to keep its ability for lamination or any other transformation operation.

Other exemplary embodiments of the invention provide a structure for E-document comprising a first support layer made in polymer defining three flaps connected by at least one fold line:
a first flap supporting, in particular comprising, a microcircuit device in the form of a strap chip and a screen printed antenna, for example in silver,
a second flap supporting, in particular comprising, a first electromagnetic interference element portion in the form of a tint area of conductive ink, screen printed for example, and
a third flap supporting, in particular comprising, a second electromagnetic interference element portion in the form of a tint area of conductive ink, screen printed for example.

The first and second flaps may be connected by a first fold line and the first and third flaps may be connected by a second fold line, such that the second and third flaps are connected by the first flap.

The two portions of the electromagnetic interference element are for example distinct and separated by two fold lines.

The first flap for example comprises the first polymer support layer and a polymer surface layer, the first layer supporting a strap chip connected to the antenna.

The first support layer and the surface layer are for example laminated via a heat-activated adhesive layer previously applied on the polymer surface layer, such that the microcircuit device is located between the first support layer and the polymer surface layer and that the chip and its antenna are embedded in the thickness of the heat-activated adhesive layer and thus thickness compensated. The surface layer may extend over the second and third flaps.

The second and third flaps may be similar and comprise the first polymer support layer and the polymer surface layer on which an electromagnetic interference element has been printed. The first support layer and the surface layer of the second and third flaps may be laminated via the heat-activated adhesive layer previously applied on the polymer surface layer, such that the electromagnetic interference elements are located between the first support layer and the surface layer, respectively.

The thickness compensation between the three flaps, related to the presence of the two electromagnetic interference elements, and/or the antenna and/or the microcircuit device in the structure, is for example realized by using the heat-activated adhesive layer which, due to its thermoplastic nature, will flow and coat the microcircuit device upon lamination.

This structure may be such that in an accordion folding configuration, for example that shown in FIG. 1b, the two electromagnetic interference elements oppose contactless reading and/or writing of the contactless integrated microcircuit device, regardless of the manner in which the structure is presented in relation to the external reader, i.e. whether it is the first or third flap that is in front of the reader.

Other exemplary embodiments of the invention provide a structure for E-document comprising a first support layer made in polymer defining three flaps connected by at least one fold line:
- a first flap supporting, in particular comprising, an integrated microcircuit device in the form of a strap chip and a screen printed antenna, for example in silver,
- a second flap supporting, in particular comprising, a first electromagnetic interference element portion in the form of a tint area of printed ink, for example in screen printing, and
- a third flap supporting, in particular comprising, a second portion of electromagnetic interference element in the form of a tint area of printed ink, for example in screen printing.

The first and second flaps are for example connected by a first fold line and the second and third flaps are connected by a second fold line, such that the first and third flaps are connected by the second flap.

The two portions of the electromagnetic interference element for example extend continuously beyond the second fold line.

The first flap for example comprises the first polymer support layer and a polymer surface layer, the first layer supporting a strap chip connected to the antenna.

The first support layer and the surface layer are for example laminated via a heat-activated adhesive layer previously applied on the polymer surface layer, such that the contactless integrated microcircuit device is located between the first support layer and the polymer surface layer and the chip and its antenna are buried in the thickness of the heat-activated adhesive and thus thickness compensated. The surface layer may extend over the second and third flaps.

The second and third flaps may be similar and comprise the first polymer support layer and the polymer surface layer on which an electromagnetic interference element was printed. The first support layer and the surface layer of the second and third flaps may be assembled by lamination via the heat-activated adhesive layer previously applied on the polymer surface layer, such that the electromagnetic interference layers are located between the first support layer and the surface layer, respectively.

The thickness compensation between the three flaps related to the presence of the two electromagnetic interference element portions and/or the antenna and/or the integrated microcircuit device in the structure is for example realized by using the heat-activated adhesive layer which, due to its thermoplastic nature, will flow and coat the microcircuit device during lamination.

In all of the above-mentioned exemplary embodiments, the microcircuit device may be operatively secured to the first flap and the electromagnetic interference element may be operatively fastened to the second flap and, where appropriate, to the third flap when the structure comprises three flaps.

This structure may be such that in a folding configuration with the first flap folded to the inside on the second flap, itself folded to the inside on the third flap, for example that shown in FIG. 1a, the two electromagnetic interference element portions oppose a contactless reading and/or writing of the integrated microcircuit device regardless of the manner in which the structure is presented to the external reader.

The invention may be better understood upon reading the description which follows, of non-limiting examples of embodiments thereof, and upon examination of the appended drawing, in which:

FIG. 8 shows a variation of the structure shown in FIG. 7, FIGS. 9 to 9f are diagrammatic illustrations, in cross-flap, of alternative embodiments of the invention.

In the drawing, the relative proportions have not always been respected, out of a concern for clarity.

Figure 2:
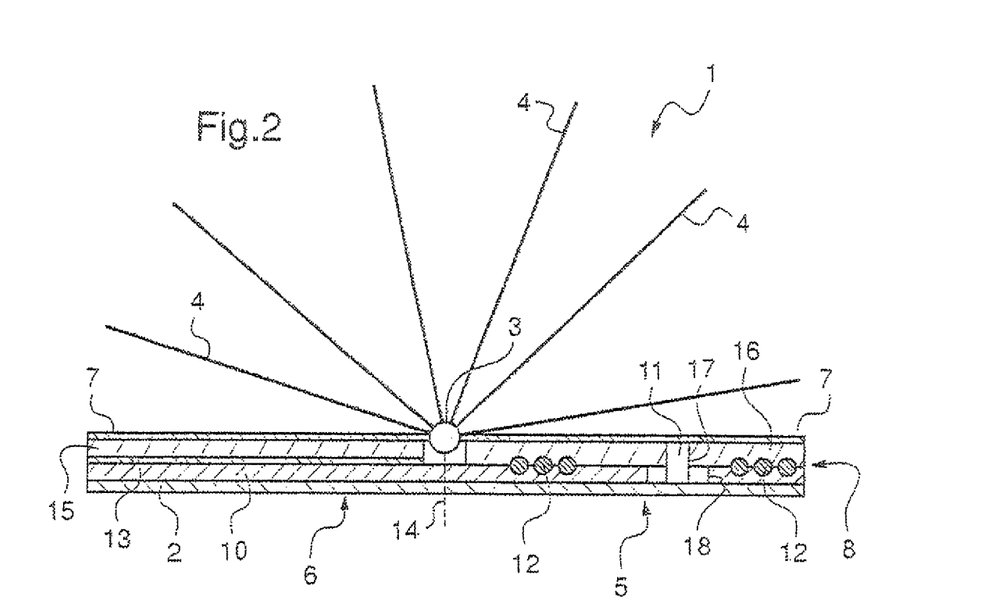
FIG. 2 illustrates a cross-flap of an example of E-document comprising a structure according to the invention.

In FIG. 2 we have shown an E-document 1 comprising a laminated structure 8 according to exemplary embodiments of the invention. In the described example, this E-document is a passport in the form of a bound booklet with two flaps, but the invention is not limited to such an example, as we will see later.

The document 1 comprises, in the described an example, a cover 2, a groove 3, a plurality of pages 4, two flyleaves 7, as well as a structure 8 which in the considered example is mounted between the cover 2 and the flyleaves 7 of the document 1.

As may be seen in FIG. 2, the structure 8 comprises, in the described example, two flaps 5 and 6 bound by a fold line 14. The two flaps 5 and 6 are defined by a first support layer 10 of a fibrous nature, for example in paper or in non-woven fabric or in polymer variation.

The two flaps of the structure shown in FIG. 2 are flat and coplanar, i.e. substantially of the same thickness on each side of the fold line. The structure in the described example has a reserve with a smaller thickness at the groove 3 of the booklet in order to facilitate folding of the booklet.

The first flap 5 of the laminated structure 8 comprises an electronic device enabling contactless data exchange, this electronic device comprising, in the described example, an integrated microcircuit device comprising a module chip 11 and an antenna 12.

In the described example, the antenna is a wire antenna, for example made in copper. The invention is of course not limited to such an example, and the antenna may for example be made by screen printing or etching.

The first flap 5 also comprises a second support layer 16. In the described example, the first support layer 10 and the second support layer 16 each have a cavity 17 or 18, these cavities being located partially opposite each other.

In the example of FIG. 2, a first part of the module chip 11 is housed in the cavity 18 of the first support layer 10 and a second part of the chip 11 is housed in the cavity 17 of the second support layer 16.

The second flap 6 of the structure 8 comprises an electromagnetic interference element 13 whereof one of the faces is, in the described example, opposite the first support layer 10, while the other face is covered by a third support layer 15 of the second flap 6.

In the considered example, the first, second and third support layers are made in paper and the thickness compensation of the integrated microcircuit device and/or the electromagnetic interference element 13 is obtained by thickness differences in the support layers 15 and 16.

The electromagnetic interference element 13 may be realized in various ways.

The electromagnetic interference element is for example an aluminum metallic film with a thickness between 5 and 50 μm or a layer of zinc obtained by pulverization, with a thickness between 5 and 80 μm, for instance.

For ease of comprehension, the adhesive layers which may be used to assemble the support layers 10, 15 and 16 of the structure 8 at the two flaps or to assemble the laminated structure 8 with the cover 2 and the cover pages 7 of the E-document 1 have not been shown in FIG. 2.

We will now describe different exemplary embodiments of a laminated structure 8 according to the invention.

Figure 3A:
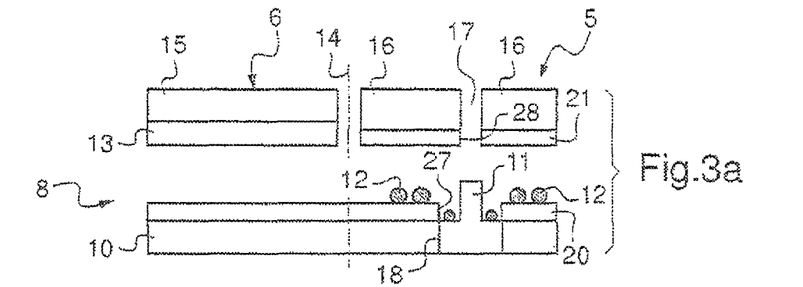
FIGS. 3a and 3b illustrate the semi-finished structure before its assembly in cross-flap and in top view, respectively.
Figure 3B:
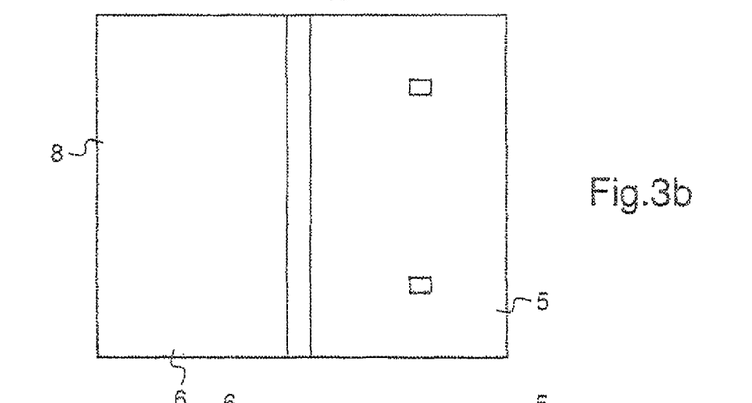

In FIG. 3a we have shown a structure 8 according to a first exemplary embodiment of the invention.

In this example, the structure 8 comprises a first support layer 10 in fibrous layer and in particular in paper, for example having a thickness of 160 μm, this first support layer being covered by a first layer of a heat-activated adhesive 20, for example in polyurethane. Alternatively, the adhesive layer 20 could be pressure-sensitive, being acrylic polymer- and colophane resin-based, for example.

In this example, the first adhesive layer 20 extends over the first flap 5 and the second flap 6.

The first flap 5 comprises a module chip 11, for example a chip of the MOB4 type marketed by the company Philips®, partially housed in the cavity 18 arranged in the support layer 10 as well as an antenna 12 of the wire type made in copper which is partially inserted by ultrasounds in the adhesive layer 20 and which is connected to the lead frame of the module chip 11.

In the described example, the first flap 5 comprises a second support layer 16 whereof the lower face is covered by a second layer 21 of a heat-activated adhesive, which is for example the same adhesive as that of the adhesive layer 20 and which is designed to come into contact with the adhesive layer 20 upon assembly of the structure 8.

The second support layer 16 may comprise a through cavity 17 in order to receive another portion of the chip 11 when the structure 8 is assembled.

The adhesive layers 20 and 21 in the described example have the same thickness, for example 15 μm.

As shown in FIG. 3a, the first and second adhesive layers can each have a through cavity 27 and 28 in order to receive a portion of the chip 11 during assembly of the structure 8.

The second flap 6 comprises an electromagnetic interference element 13 and a third support layer 15. The electromagnetic interference element 13 is for example made in zinc and directly pulverized on the third support layer 15. The thickness of the electromagnetic interference element 13 is for example 50 μm.

In the examples of FIGS. 3a to 5a, the second and third support layers 15 and 16 are realized in fibrous layer, for example in paper, but it is not beyond the scope of the present invention when these support layers are in polymer layer.

In the example of FIG. 3a, the adhesive layer 21 and the second support layer 16 do not extend over the entirety of the first flap 5, and the electromagnetic interference element 13 and the third support layer 15 do not extend over the entirety of the second flap 6 so as to obtain a thickness reserve at the fold line 14 of the structure 8.

In this example, the electromagnetic interference element 13 does not have a face covered by an adhesive layer before assembly on the first support layer 10 of the structure 8.

As shown in FIG. 3a, the third support layer 15 and the second support layer 16 have distinct thicknesses, the third support layer 15 having a thickness of 185 μm, for example, while that of the second support layer 16 is 220 μm for example.

This thickness difference between the second and third layers can make it possible to offset the presence of the second flap of the electromagnetic interference element 13. Thus, the structure obtained has two flaps 5 and 6 which are coplanar, i.e. having substantially the same thickness.

Figure 4A:
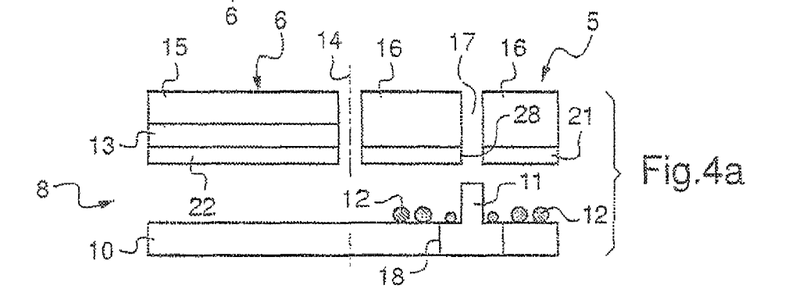
FIGS. 4a, 4b, 5a, 5b and 6a, 6b are views similar to FIGS. 3a and 3b of other alternative embodiments of the invention.
Figure 4B:
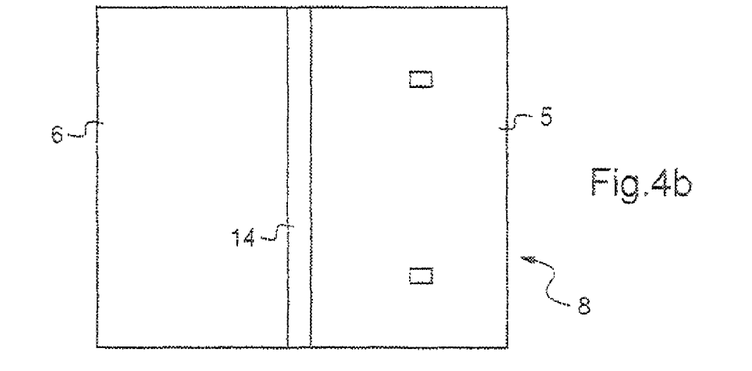

FIGS. 4a and 4b show another example of a structure according to the invention. In this example, the first support layer 10 is provided, before assembly of the structure 8, without an adhesive layer.

The first flap 5 in this example comprises a layer of a heat-activated adhesive 21 covering one face of a second fibrous support layer 16, this adhesive layer 21 being designed to come into contact with the first support layer 10 during assembly of the structure. This adhesive layer 21 is provided with a through cavity 28 designed to receive a portion of the chip 11 during assembly of the structure.

The second flap 6 comprises an adhesive layer 22 designed to come into contact with the first support layer 10 during assembly of the structure and covering one face of the electromagnetic interference element 13. As shown in FIG. 4a, the face of the electromagnetic interference element 13 opposite that covered by the adhesive layer 32 is covered by the third fibrous support layer 15.

In this example, the electromagnetic interference element 13 is realized by a layer of zinc directly pulverized on the third support layer 15, having a thickness of 60 μm for example. The heat-activated adhesive of the layer 21 is for example the same as that of the layer 21 described in reference to FIG. 3a.

In the considered example, the adhesives of the layer 21 and the adhesive of the layer 22 are different in nature, the latter being adapted to the assembly of the metallic electromagnetic masking element 13 with the second fibrous support layer 10, such as a monocomponent polyurethane.

The adhesive layers 21 and 22 may have the same thickness, for example 15 μm.

The third support layer 15 for example has a thickness of 160 μm while the second support layer 16 for example has a thickness of 220 μm, such that once assembled, the first and second flaps of the structure have substantially the same thickness.

As shown in FIG. 4a, the heat-activated adhesive layer 21 and the second support layer 16 are arranged on the first flap 5 on one hand and the adhesive layer 22, the electromagnetic interference element 13 and the third support layer 15 are arranged on the second flap 6 on the other hand, so as to obtain a thickness reserve at the fold line 14 of the structure 8.

Figure 5A:
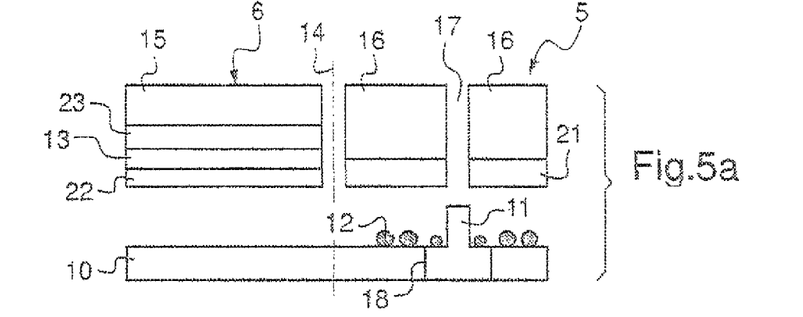
Figure 5B:
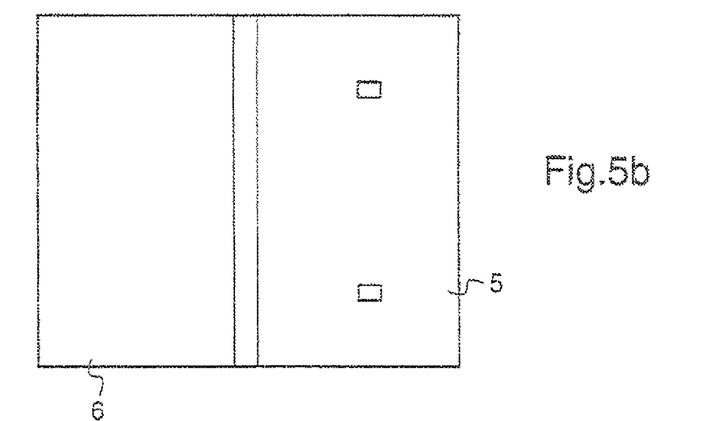

FIGS. 5a and 5b show another example of structure according to the invention.

In this example, the first flap 5 comprises a first heat-activated adhesive layer 21 covering, before assembly of the structure 8, one face of the second support layer 16 and designed to come into contact with the first support layer 10 during assembly.

The second flap 6 comprises an electromagnetic interference element 13 in the form of an aluminum film, for example 40 μm thick, sandwiched between two layers of heat-activated adhesive 22 and 23.

The second adhesive layer 22 is for coming into contact with the first support layer 10 during assembly of the structure.

The third adhesive layer 23 is covered by a third support layer 15 in the described example.

In the described example, before assembly of the structure 8, the first support layer 10 is provided without adhesive layer.

As one may see, the first adhesive layer 21 supported by the first flap 5 is thicker than the second adhesive layer 22 supported by the second flap 6.

The adhesive of the third layer 23 is for example different from the adhesive of the first and second layers 21 and 22.

As shown in FIG. 5a, the first heat-activated adhesive layer 21 and the second support layer 16 are arranged on the first flap 5 on one hand and the second adhesive layer 22, the electromagnetic interference element 13, the third adhesive layer 23 and the third support layer 15 are arranged on the second flap 6 on the other hand, so as to obtain a thickness reserve at the fold line 14 of the structure 8.

In this example, the flaps 5 and 6 differ on one hand by the thickness of the adhesive layers 21, 22 and 23 that they comprise, and on the other hand by the thickness of the second and third support layers, which makes it possible to offset the additional thickness caused by the presence of the chip 11 and the antenna 12 in the first flap 5 and by the electromagnetic interference element 13 in the second flap 6. Thus, the two flaps are coplanar.

Figure 6A:
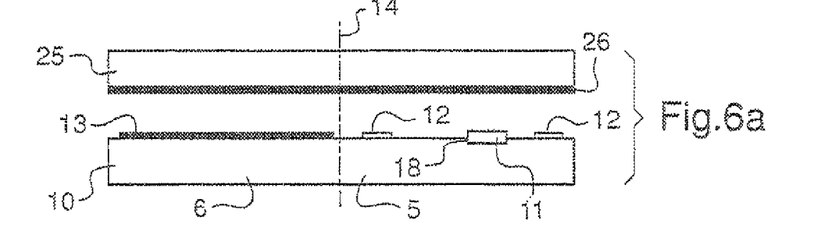
Figure 6B:
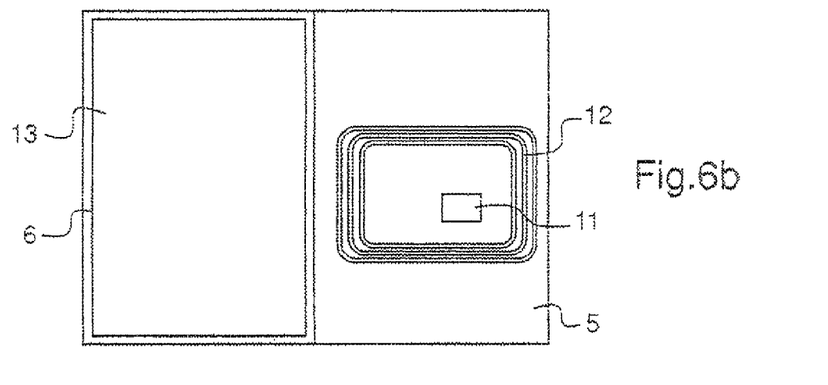

FIGS. 6a and 6b show a structure according to another exemplary embodiment of the invention.

In this example, the structure 8 comprises a first support layer 10 made in polymer layer, for example transparent polymer.

This first support layer defines two flaps 5 and 6 connected to each other by a fold line 14 realized in the described example by scoring. The first flap 5 comprises a chip 11, as well as a screen printed antenna 12, for example with silver-based ink. This antenna is connected to the chip using the Flip Chip method. In the described example, the chip 11 is secured on the first support layer 10.

The second flap 6 comprises an electromagnetic interference element 13 realized in the described example by printing a pattern, for example a rectangle, with a transparent conductive polymer on the first support layer 10.

The structure 8 also comprises, before assembly, a surface layer 25 supporting, on its face opposite the first support layer 10, a layer 26 of adhesive, for example a heat-activated adhesive, for example in polyethylene.

This surface layer 25 is in particular realized in the same material as the first support layer 10.

The adhesive layer 26 of thermoplastic nature makes it possible to receive, at least partially, the chip 11, the antenna 12 and the electromagnetic interference element 13 in its thickness during lamination of the support layers 10 and 25.

Figure 7:
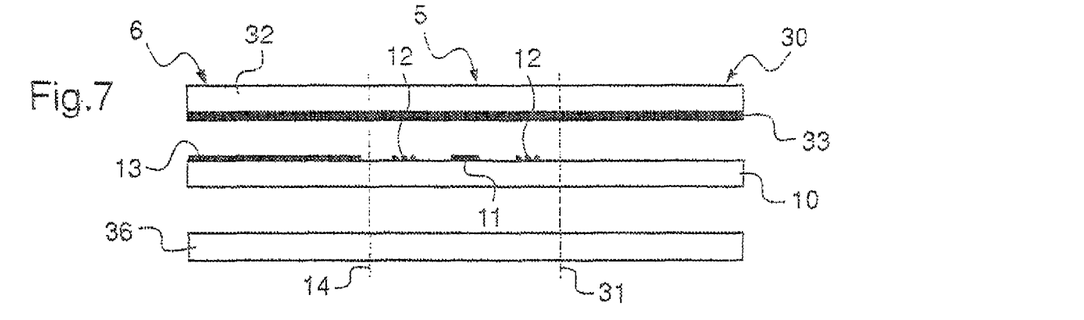
FIG. 7 is an exploded cross-flap of another example of structure according to the invention.
Figure 8:
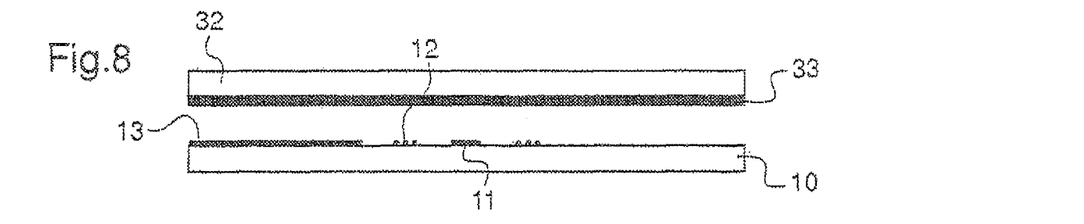
Figure 9:
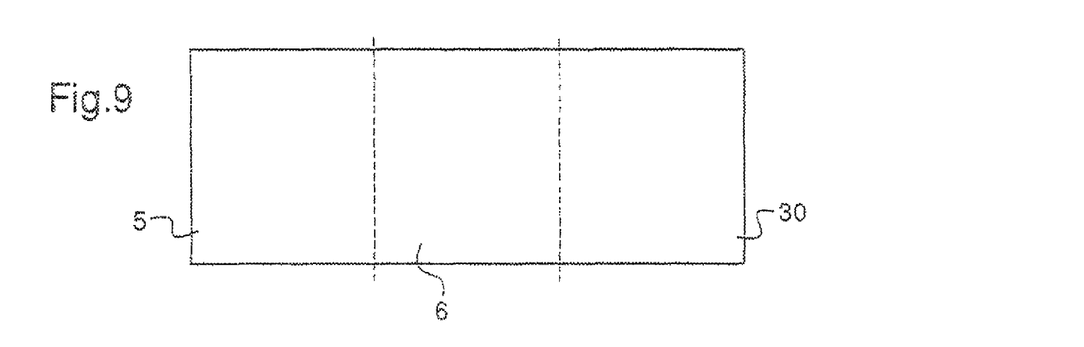

FIGS. 7 to 9 show structures according to other exemplary embodiments of the invention. Such structures 8 define three flaps 5, 6 and 30 and comprise two fold lines 14 and 31. Such structures are, for example, adapted to E-documents having three flaps, such as driver's licenses.

In the example shown in FIG. 7, the structure 8 comprises a first paper support layer 10, comprising an electronic device in the form of a chip 11 connected to an antenna 12 and an electromagnetic interference element 13.

The structure may also comprise a surface layer 32 which is, in the considered example, realized in paper and has a uniform thickness over all three flaps 5, 6 and 30. This surface layer 32 is for example covered by a layer of a heat-activated adhesive 33 on its face opposite the first support layer 10.

As shown in this FIG. 7, the adhesive layer 33 may extend continuously over the first, second and third flaps. The invention is of course not limited to such an example, the layer 33 being able to assume the form of three distinct layers supported by the first, second and third flaps, respectively, and not directly connected to each other.

In the example of FIG. 7, the structure 8 also comprises a bottom layer 36 making it possible, for example, to increase the thickness of the structure or provide more rigidity to the structure.

A structure of this type, when it is accordion folded according to FIG. 1b, prevents any reading or modification of the data stored in the chip, in particular when the flap comprising the electromagnetic interference element is placed between the reader and the flap comprising the integrated microcircuit device.

FIG. 8 shows a structure according to another exemplary embodiment of the invention, only differing from the example shown in FIG. 7 by the absence of the bottom layer 36.

Figure 9A:
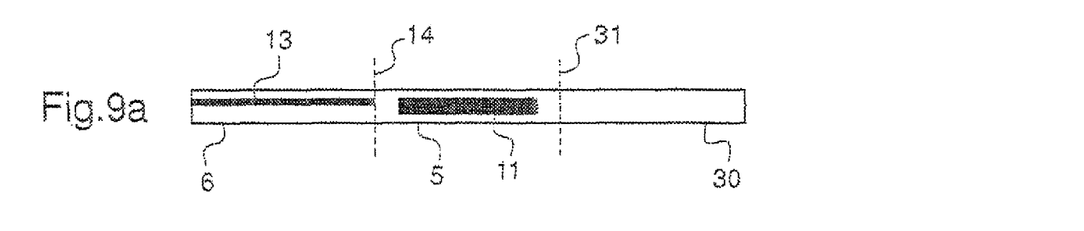
Figure 9B:
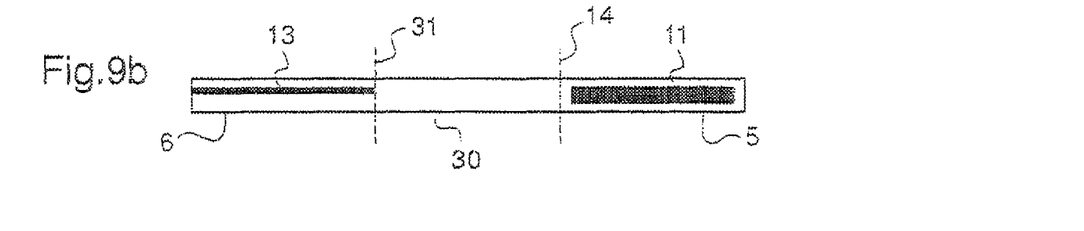
Figure 9C:
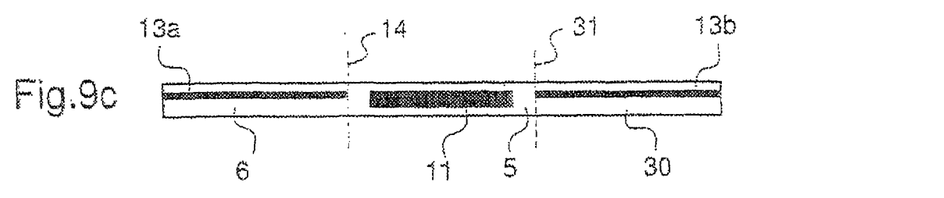
Figure 9D:
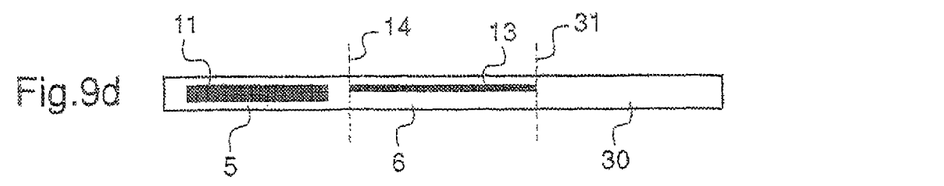
Figure 9E:
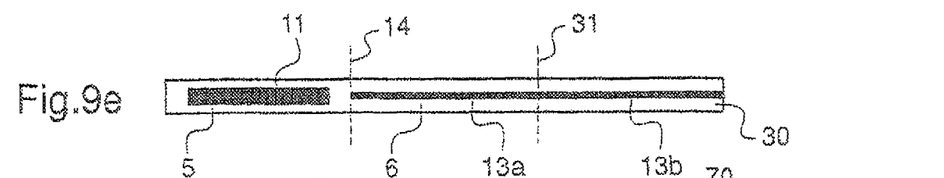
Figure 9F:
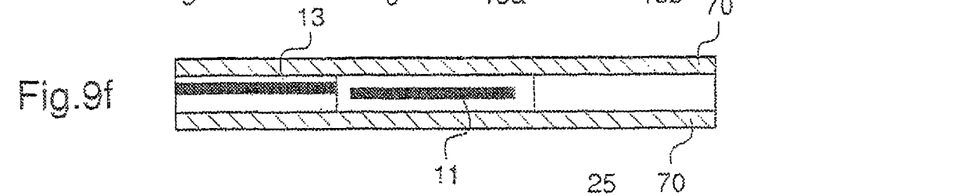

The examples described in FIGS. 9 to 9f show alternative three-flap structures.

In the example of FIG. 9a, the third flap 30 is connected by the fold line 31 to the first flap which is arranged between the second and third flaps. In this example, the third flap 30 is without an electromagnetic interference element.

In the example of FIG. 9b, the third flap 30 is connected by the fold line 14 to the first flap and by the fold line 31 to the second flap, the first and second flaps in this example being connected via the third flap. In this example, the third flap 30 is without electromagnetic interference element.

The example shown in FIG. 9c differs from that shown in FIG. 9a in that the electromagnetic interference element 13 comprises a first interference element portion 13a supported by the second flap 6 and a second interference element portion 13b supported by the third flap 30, the structure being arranged such that, when it is unfolded, the integrated microcircuit device 11 is surrounded, along at least one dimension, by the first and second portions 13a and 13b of the electromagnetic interference element 13. In this example, the first and second electromagnetic interference element portions are distinct, i.e. not attached.

In the example of FIGS. 9d and 9e, the third flap 30 is connected by the fold line 31 to the second flap, the latter being connected by the fold line 14 to the first flap 5.

In the example of FIG. 9d, the third flap 30 is provided with an electromagnetic interference element while in the example of FIG. 9e, the electromagnetic interference element 13 assumes the form of two interference element portions 13a and 13b supported by the second and third flaps, respectively, and connected to each other such that the electromagnetic interference element 13 extends continuously over the second and third flaps beyond the fold line 31.

FIG. 9f illustrates the possibility for the structure, for example a structure as illustrated in FIGS. 9a to 9e, to be arranged between two transparent sheets 70, for example films in transparent plastic material assembled in order to form a protective pouch, or alternatively laminated on the outer faces of the structure.

Figure 10:
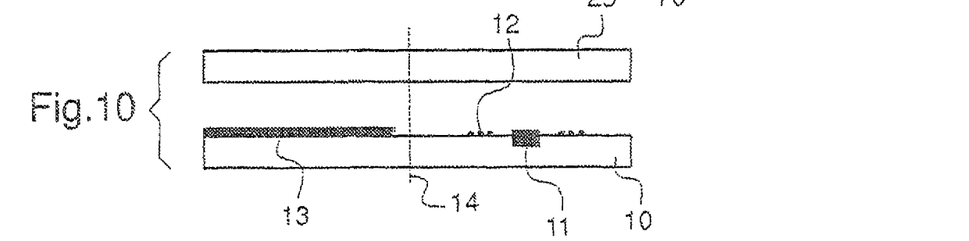
FIG. 10 shows, in cross-flap, an alternative embodiment of the structure.

In one variation, the structure comprises, as illustrated in FIG. 10, a first support layer 10 realized in thermoweldable polymer, for example in polypropylene.

This first support layer defines two flaps 5 and 6 connected to each other by a fold line 14 realized in the described example by scoring. The first flap 5 comprises a chip 11 with a first antenna installed on its integrated circuit (also called "AOB" chip), for example a chip by the company Hitachi, as well as a second coupling antenna 12 in order to increase the reading distance of this chip, this antenna being deposited by ultrasounds around the chip 11 on the layer support 10.

The structure may also comprise, before assembly, a surface layer 25 of the same nature as the support layer 10.

The second flap 6 in this example comprises an electromagnetic interference element 13 realized in the form of a grid printed with a conductive ink, this grid being positioned on one portion of the flap 6 of the layer support 10 so as to leave the external edges free for their later assembly with the layer 25, by lamination.

After hot and pressurized assembly of the support 10 and surface 25 layers, the electromagnetic interference element 13 and the contactless RFID device 11 with its coupling antenna 12 are taken inside the structure. During lamination, the interference element, the RFID device and the antenna are buried in the polypropylene of the layer and surface supports. The structure thus obtained in flat and coplanar at the two flaps 5 and 6.

The invention is not limited to the embodiments just described.

The E-document is, for example, an identity card, transportation title, subscription title or access control document.

Characteristics of the different embodiments described in non-illustrated alternatives may be combined.

The expression "comprising a" must be understood as being synonymous with "comprising at least one", unless specified to the contrary.

The invention claimed is:

1. A laminated structure for E-document, the structure being mounted between pages of the E-document and a cover of the E-document, the structure comprising a first support layer defining at least two flat flaps connected by at least one fold line:
   the first flap supporting an antenna and a microcircuit device enabling contactless data exchange,
   the second flap supporting an electromagnetic interference element arranged in relation to the microcircuit device so as to be able to oppose at least one of contactless reading and contactless writing of the microcircuit device in at least one folded configuration of the structure, wherein the structure comprises at least one heat-actiyated or pressure-sensitive adhesive layer making it possible to receive the microcircuit device and/or the antenna and/or the electromagnetic interference element at least in part in its thickness, and at least one of:
   at least one fibrous layer, and
   a polymer layer,
   the at least one fibrous layer or polymer layer comprising second and third support layers, supported by the first flap and second flap, respectively, wherein the second and third support layers have different thicknesses for each of the flaps, the antenna being located between the first and the second support layers, and the electromagnetic interference element being located between the first and the third support layers.

2. The structure according to claim 1, the electromagnetic interference element comprising a magnetic material, a conductive material, or a resonator circuit.

3. The structure according to claim 1, the first support layer comprising at least one cavity in which the microcircuit device is at least partially housed.

4. The structure according to claim 3, the cavity being a through cavity.

5. The structure according to claim 3, wherein:
   the second support layer comprises a cavity in which the microcircuit device is at least partially housed; and
   the cavity of the first support layer and the cavity of the second support layer are at least partially opposite each other, so as to form a housing in order to receive the microcircuit device.

6. The structure according to claim 1, the first support layer being of the fibrous or polymer type.

7. The structure according to claim 1, the second support layer comprising a cavity in which the microcircuit device is at least partially housed.

8. The structure according to claim 7, the cavity being a through cavity.

9. The structure according to claim 1, the third support layer comprising a cavity in which the electromagnetic interference element is housed.

10. The structure according to claim 1, comprising two adhesive layers supported by the first flap and the second flap, respectively, the two layers of adhesive having different thicknesses.

11. The structure according to claim 10, the second flap comprising two adhesive layers between which the electromagnetic interference element is arranged.

12. The structure according to claim 1, the adhesive layer supported by the first flap comprising a cavity in which the microcircuit device is at least partially housed.

13. The structure according to claim 1, the second support layer only partially extending over the first flap and the third support layer only partially extending over the second flap, so as to arrange a thickness reserve at the fold line.

14. The structure according to claim 1, comprising at least one layer of a heat-activated or pressure-sensitive adhesive between at least one of the first support layer and the second support layer, and the first support layer and the third support layer.

15. The structure according to claim 1, the second and third support layers being of the fibrous or polymer type.

16. The structure according to claim 1, comprising a surface layer extending over the first and second flaps.

17. The structure according to claim 16, comprising at least one layer of a heat-activated or pressure-sensitive adhesive located between the first support layer and the surface layer and making it possible to receive at least one of the integrated microcircuit device, the antenna and the electromagnetic interference element at least partially in the thickness of the adhesive layer.

18. The structure according to claim 16, the surface layer being made in polymer.

19. The structure according to claim 1, comprising two flaps and being configured to be secured between the cover and the flyleaf of an E-document in the form of a booklet.

20. The structure according to claim 1, the electromagnetic interference element extending over only one portion of the scope of the structure.

21. The structure according to claim 1, the electromagnetic interference element extending over the entire scope of the structure.

22. The structure according to claim 1, the first and second flaps being coplanar.

23. An E-document comprising a structure according to claim 1.

24. A laminated structure for E-document, the structure being mounted between pages of the E-document and a cover of the E-document, the structure comprising a first support layer defining at least two flat flaps connected by at least one fold line:
   the first flap supporting an antenna and a microcircuit device enabling contactless data exchange, the second flap supporting an electromagnetic interference element arranged in relation to the microcircuit device so as to be able to oppose at least one of contactless reading and contactless writing of the microcircuit device in at least one folded configuration of the structure, the first support layer defining a third flap connected to the first flap or the second flap by a fold line, wherein the structure comprises at least one of the following:
a) at least one heat-activated or pressure-sensitive adhesive layer making it possible to receive at least one of the microcircuit device, the antenna and the electromagnetic interference element at least in part in a thickness of the adhesive layer, and
b) flaps having at least one of:
   at least one layer of an adhesive,
   at least one fibrous layer, and
   a polymer layer,
the adhesive layer, the fibrous layer or the polymer layer extending on both flaps and having a different thickness for each of the flaps.

25. The structure according to claim 24, comprising a surface layer extending over the first, second, and third flaps.

26. The structure according to claim 25, comprising at least one layer of a heat-activated or pressure-sensitive adhesive located between the first support layer and the surface layer and making it possible to receive at least one of the integrated microcircuit device, the antenna and, the electromagnetic interference element at least partially in the thickness of the adhesive layer.

27. The structure according to claim 26, the adhesive layer extending over the first, second, and third flaps.

28. The structure according to claim 27, the adhesive layer extending continuously over the surface layer.

29. The structure according to claim 24, the electromagnetic interference element comprising two interference element portions supported by the second and third flaps, respectively.

30. The structure according to claim 29, the two interference element portions extending continuously beyond the fold line.

31. The structure according to claim 29, the two interference element portions being distinct.

* * * * *